United States Patent [19]

Urano

[11] Patent Number: 4,472,350

[45] Date of Patent: Sep. 18, 1984

[54] METHOD OF MAKING A COMPOUND VALVE SEAT

[75] Inventor: Shigeru Urano, Omiya, Japan

[73] Assignee: Nippon Piston Ring Co., Ltd., Tokyo, Japan

[21] Appl. No.: 502,804

[22] Filed: Jun. 9, 1983

[30] Foreign Application Priority Data

Jun. 9, 1982 [JP] Japan ................... 57-97853

[51] Int. Cl.$^3$ ............................ B22F 3/00; B22F 7/08
[52] U.S. Cl. ......................................... 419/6; 419/5; 419/7; 264/113; 428/548
[58] Field of Search .................... 419/5, 6, 7; 264/113; 428/548

[56] References Cited

U.S. PATENT DOCUMENTS 4,419,413 12/1983 Ebihara ............................. 419/6 X

FOREIGN PATENT DOCUMENTS 2745020 4/1979 Fed. Rep. of Germany .......... 419/5
1383429 2/1975 United Kingdom ................... 419/5

Primary Examiner—Leland A. Sebastian
Attorney, Agent, or Firm—Sughrue, Mion, Zinn, Macpeak & Seas

[57] ABSTRACT

A valve seat or similar article produced by sintering a compound body is improved in economy and producibility by employing a method wherein the amount of a second powder for forming the compound body is controlled so as to be minimized. A first powder is initially charged into a compression space and lightly compressed to form a preparatory compact of a desired shape. Subsequently, the second powder is charged in over the preparatory compact to a degree controlled by the displacement of the compact, and the preparatory compact and the second powder are forcefully compressively integrally molded to form a final compact which is then sintered to form the finished product.

10 Claims, 14 Drawing Figures

METHOD OF MAKING A COMPOUND VALVE SEAT

BACKGROUND OF THE INVENTION

The present invention relates to a method of producing a valve seat for a suction-exhaust valve of an internal combustion engine, and particularly to a method of producing a compound valve seat formed by a powder metallurgy technique.

Special materials are typically used for valve seats because the valve seat is required to withstand abrasion due to beating against the valve as well as corrosion/-wear due to high temperatures. A sintered alloy is generally used because of its superior producibility. As the sintered alloy valve seat, generally, stellite powder or ferro-molybdenum powder for forming hard particles is mixed with base iron powder and then sintered to obtain a material in which hard particles and sinter holes are dispersed in the iron-base sintered alloy base, which material is superior in wear-proof characteristics. However, the sintered alloy contains a large amount of hard particles as mentioned above, and therefore a large amount of valuable elements such as cobalt and tungsten are required, so as to make the product expensive. Accordingly, the part of the cylinder head side of the valve seat in which wear-proofing is not required may be made of a sintered alloy requiring little additional elements, having a predetermined strength, and having a thermal expansion factor and a sintering shrinkage factor both of which approximate those of the sintered alloy at the valve seat side, so as to fabricate a compound valve seat.

As shown in FIG. 1, the compound valve seat is made of a first sintered alloy 11 forming the cylinder head side and a second sintered alloy 12 forming a valve seat surface side, produced in a manner such that after a first powder for forming the first sintered alloy has been charged into a metal mold, a second powder for forming the second sintered alloy is charged over the first powder and the two layers of stacked powder are integrally compressively molded. In this method, the boundary plane between the first and second powder is indefinitely formed to cause large variations in the shape thereof, so that it is necessarily required to make the quantity ratio of the second powder, which attains the function of the valve seat per se, to the first powder large.

In order to reduce the quantity of the second powder, to attain resource savings and cost reduction which are the main objects of the compound valve seat, a valve seat as shown in FIG. 2 has been conventionally proposed. In the valve seat of FIG. 2, the second sintered alloy 12 is disposed only at the position including the valve seat surface. Such seat structure is disclosed, for example, by Japanese patent publication No. 39166/1976. To produce the compound valve seat shown in FIG. 2, it is necessary to prepare to a press-molding machine provided with two coaxial lower punches, resulting in problems in that not only is the operation of the molding machine complicated, but the lifetime of the lower punches is short and the practical application of the relative position control of the two lower punches is difficult and requires a high precision technique.

Further, in producing a compound sintered member, a method has been proposed in which the first powder is charged in advance and preparatively compressively molded, and then the second powder is charged, as disclosed, for example, by Japanese patent application Laid-Open No. 11280/1974 and Japanese patent publication No. 43963/1979. This method is, however, generally used for producing a valve seat constituted by two laterally arranged inner and outer layers, and therefore it is difficult to employ this method in producing a compound valve seat constituted by two vertically disposed upper and lower layers.

That is, when a space for charging the second powder thereinto is formed around the preparatory green compact preliminarily formed with the first powder, there is a risk of deformation or deintegration of the preparatory green compact because of the spring-back force of the pregreen green compact per se. Further, since the preparatory compact which has been preliminarily compressively formed is pressed against a die and/or a core rod by the spring-back force thereof, it is difficult to form a predetermined space above the compact by moving the die/core-rod and therefore there is a limitation in the form of the moldings.

Further, since a valve seat has a shape such that, as shown in FIGS. 1 and 2, the valve seating surface is largely chamfered, a conically-shaped protrusion corresponding to the shape of the valve seat surface is provided on an upper or lower punch of the press-molding machine. When the protrusion is provided on the upper punch, however, powder D of a quantity corresponding to the volume of the protrusion 51 may overflow onto the top surface of the die 2 as shown in FIG. 3, resulting in the mixture of different kinds of powders in the manufacture of the compound valve seats, and therefore the protrusion is usually provided on the lower punch. In the case where the protrusion is formed on the lower punch, however, the press-molding machine can only produce such a compound valve seat as shown in FIG. 1, which is not effective in reducing the quantity of the second sintered alloy.

SUMMARY OF THE INVENTION

The present invention is intended to improve the conventional method of producing a compound valve seat or method of producing a compound sintered body, and an object of the present invention is to provide a method of producing a compound valve seat in which resource savings is attained and producibility is made superior by using a molding machine having a long lifetime and superior structure.

According to an aspect of the method of the present invention, a compound valve seat is manufactured by the following six steps:

(1) A lower punch is caused to move relatively downwardly to form a first space and a first feed shoe is advanced to charge the first powder into the first space;

(2) An upper punch provided with a conically-shaped protrusion at its inner circumference is moved down to compress the first powder to form a preparatory green compact;

(3) The upper punch is moved up, and at the same time the lower punch is moved relatively to a die so as to dispose the upper surface of the preparatory green compact in a predetermined position, and a second feed shoe is advanced to charge the second powder into a space formed above the preparatory green compact;

(4) The upper punch is moved downwardly to compressively integrally mold the second powder together with the preparatory green compact to form a final green compact;

(5) The upper punch is moved upwardly and at the same time the lower punch is also relatively moved upwardly to remove the final green compact; and (6) The final green compact is sintered.

DETAILED DESCRIPTION OF THE PREFERRED EMBODIMENTS

An embodiment of the method of producing a compound valve seat according to the present invention will now be described.

Figure 1:
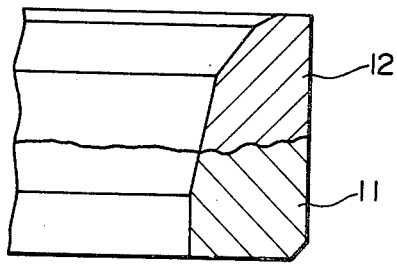
FIG. 1 is a cross-section of a prior art compound valve seat.
Figure 2:
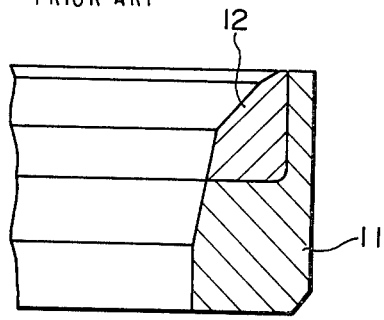
FIGS. 2 and 3 are cross-sections of another prior art compound valve seat.
Figure 3:
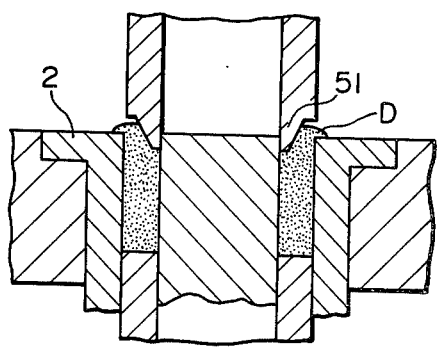
Figure 4:
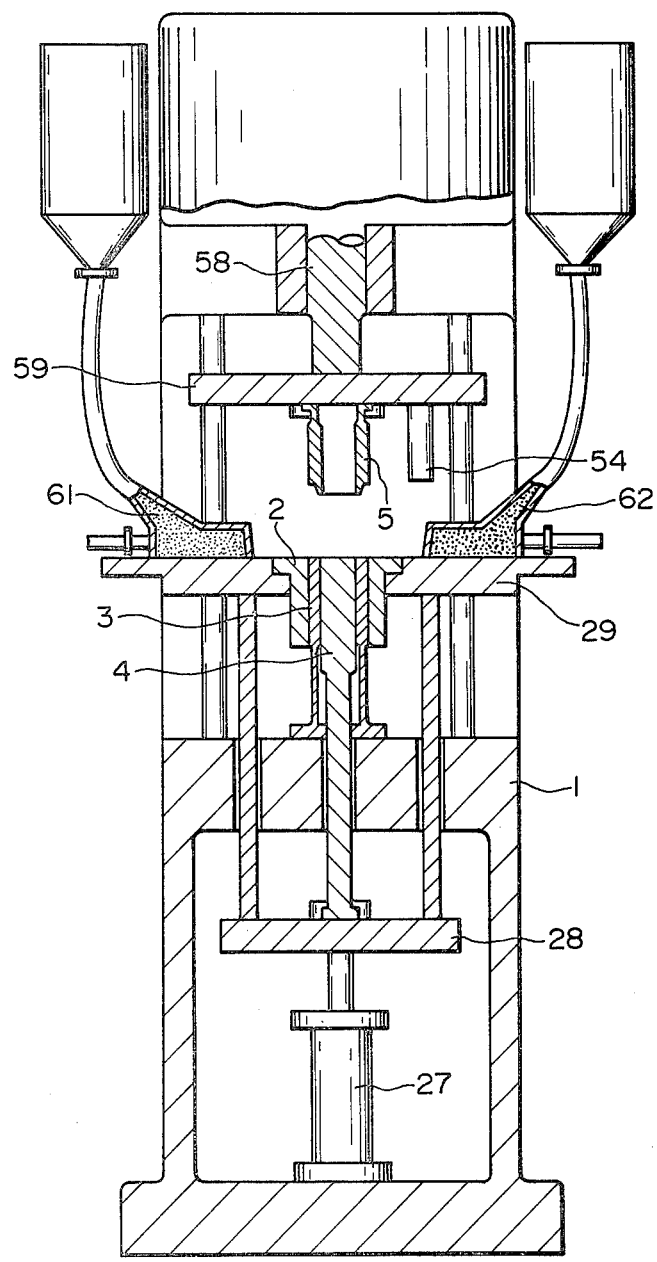
FIG. 4 is a cross-section illustrating an embodiment of the present invention.

FIG. 4 is a cross-section of an embodiment of a powder molding machine used in the compound valve seat producing method according to the present invention. A die 2, a lower punch 3, a core rod 4 and an upper punch 5 are disposed on a base 1, and the upper punch 5 is arranged so as to be movable up/down by an upper ram 58 through an upper ram plate 59. The lower punch 3 is attached directly to the base 1 and the die 2 is attached to a lower ram plate 28 through a die plate 29 so as to be movable up/down together with the core rod 4. A first and a second feed shoe 61 and 62 are attached onto the die plate 29 so as to be movable to and fro.

FIG. 4 shows the machine in the state of the initiation of the manufacturing according to the invention, in which the upper punch 5 is at its upper limit and the lower ram plate 28 is also at its upper limit so as to dispose the upper surface of each of the lower punch 3 and the core rod 4 at an even level of height with the upper surface of the die 2.

Figure 5:
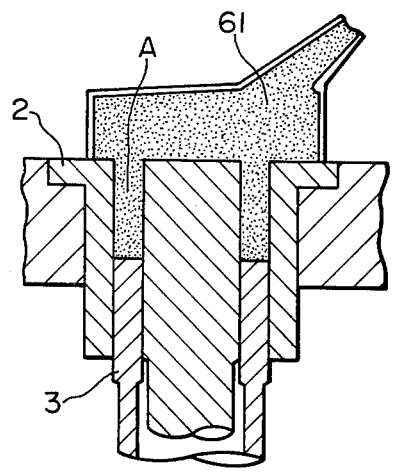
FIGS. 5-11 are partial cross-sections explaining a first embodiment of the present invention.

Thereafter, as shown in FIG. 5, the die 2 is caused to move up so as to relatively lower the lower punch, and at the same time the first feed shoe 61 is caused to advance to charge the first powder A onto the lower punch 3. At this time, it is preferable to arrange the device such that the powder 4 is sucked downwardly by the lifting operation of the die 2 from the state of FIG. 4 when the feed shoe 61 is advanced.

Figure 6:
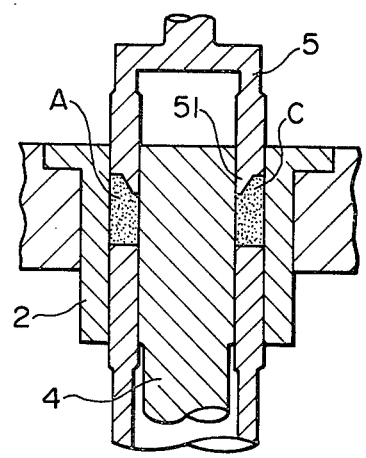

Next, the upper punch 5 is caused to move down, as shown in FIG. 6, to compress the powder A to form it into a preparatory green compact C. The upper punch 5 is provided at its inner circumference with a conically-shaped protrusion 51 corresponding to the valve seating or contact surface of the valve seat. The compressive-molding performed by the upper punch 5 is intended only to imprint the shape of the upper punch 5 onto the upper surface of the preparatory green compact and substantial compressive-molding is not performed in this step. This is because that if the first powder is compressively-molded to the completed density, the surface of the preparatory green compact is made mirror-like so that even if the second powder is charged onto the preparatory green compact and compressively molded, the two green compacts cannot couple with each other, and therefore, a compound sintered valve seat cannot be attained. Accordingly, it is necessary to form the surface of the preparatory compact so as to have a density which is lower by at least 50% than the completed density. In order to make the surface have such a density, it is desirable to mold the first powder with a pressure at least lower than the pressure used to make the completed molding, more particularly, with a pressure which is equal to or lower than one third of the pressure required for the completed molding.

It is preferable to perform the molding mentioned above using only the upper punch 5 without moving the die 2 as well as the core rod 4, as shown in FIG. 6.

Figure 7:
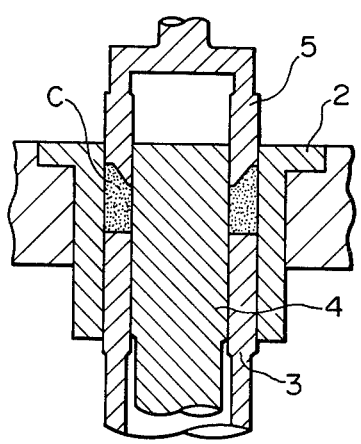

Subsequently, as shown in FIG. 7, the die 2 and/or the core rod 4 is moved down to form a predetermined space between the respective upper surfaces of the preparatory green compact C and the die 2, while maintaining the compact C in the state supported by the upper punch 5 and the lower punch 3. At this time, if the die 2 is moved downwardly with the upper punch 5 held in its lifted state, the shape of the upper surface of the compact C, which has been lightly pressed, may easily be deformed by the frictional force with the die 2. It is preferable to support the preparatory green compact C with the upper punch 5 as well as the lower punch 3. Although the die 2 has been described as being moved down, with respect ot FIG. 7, it is required to maintain the upper punch 5 in its lowered state in the case where the die is caused to move up to form a large space above the compact C because the compact C may come up together with the die 2 if the upper punch 5 is not in its lowered state.

Figure 8:
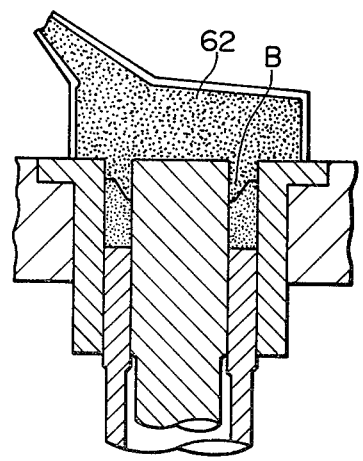

Next, as shown in FIG. 8, the upper punch 5 is moved up and the second feed shoe 62 is advanced to charge in the second powder B. The charging quantity of the second powder is properly selected by the displacement value of the die 2 of FIG. 7.

Figure 9:
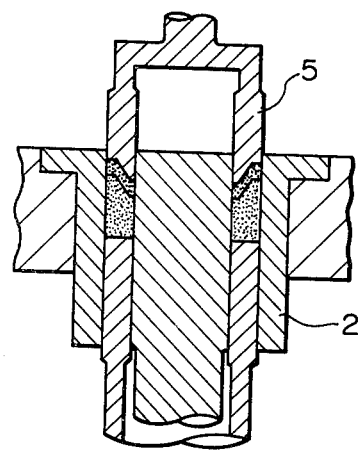
Figure 10:
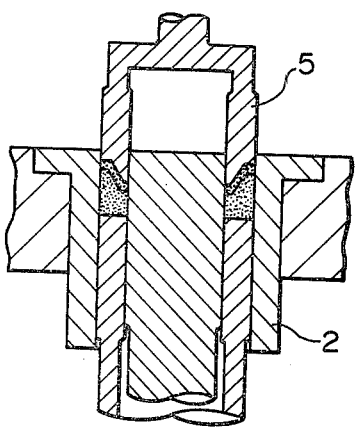

Next, as shown in FIG. 9, the upper punch 5 is again moved down so as to compressively mold the second powder together with the preparatory green compact C, and then, as shown in FIG. 10, the die 2 is moved down along with the upper punch 5. The powders are compressively molded until they form a final green compact having the finally completed density. In this case, it is preferable that the upper portion of the green compact be first molded only by lowering the upper punch 5 as shown in FIG. 9, and then the lower portion of the same molded by simultaneously lowering the upper punch 5 and the die 2 at the same speed, to thereby make the green compact uniform in density in the compression directions.

Next, the upper punch 5 is moved up, while the die 2 is lowered to the same level as the lower punch 3 and the final green compact E of compound valve seat is removed.

The thus formed final green compact E is sintered by the usuall technique. Particularly, it is sintered under the sintering conditions of ferroalloy, at a temperature in the range 1100°-1200° C. for 15 minutes in a reducing atmosphere.

According to usage, the valve seat may be thereafter subjected to the usual processing for the valve seats, such as heat treatment, impregnation, infiltration, steam treatment, etc.

Figure 12:
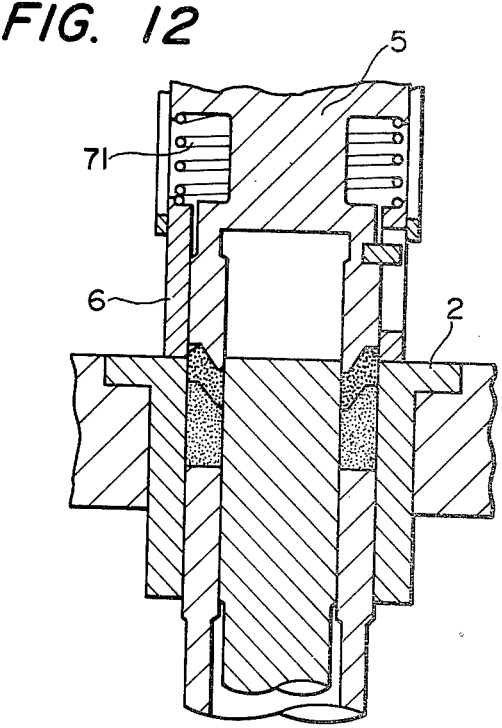
FIGS. 12 and 13 are cross-sections illustrating other embodiments of the present invention.

Further, although there is a high possibility that the powder may overflow onto the die when the powder is compressively molded, since a conically-shaped protrusion for forming the valve contact surface is provided on the upper punch 5 according to the present invention, the overflow of the powder onto the die due to the lowering of the upper punch 5 can be prevented by a sleeve 6 fitted onto the outer periphery of the upper punch 5 and fixed to the same through a spring 61 as shown in FIG. 12, because the upper surface of the die 2 can be in contact with the sleeve 6 before the upper punch 5 has reached the upper surface of the powder. Although it may be alternatively considered to form a space above the powder by lifting the die in place of the provision of the sleeve 6, this operation becomes complicated and therefore the producibility and accuracy of the products are deteriorated correspondingly. Thus, it is rather preferable to provide the sleeve on the upper punch 5.

Although a press-molding machine of the type in which the lower punch is fixed is employed in the embodiment described above, a press-molding machine of the type in which the die or the upper punch is fixed may be used. In the latter case, it is necessary to arrange the upper and lower punches and the die so as to be actuated satisfying the relationships of relative displacements among the upper and lower punches and the die as described with respect to the embodiment shown in FIGS. 5 to 11.

Figure 13:
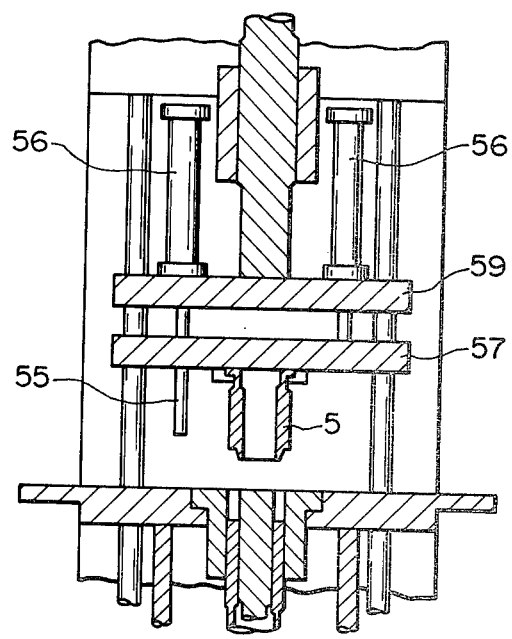

Further, in order to attain the production of a compound valve seat according to the present invention, it is necessary to change the lowering quantity of the upper punch 5 between the cases of the compressive-molding of the first and second powders, as is apparent from a comparison between FIGS. 6 and 10. To this end, a molding machine of the type having means for adjusting the lowering quantity of the upper punch as shown in FIG. 13 may be employed. It is required for valve seat molding to use a molding machine having several hundreds of tons of molding pressure force, and therefore a molding machine of the fixed lower punch type is used.

That is, a punch plate 57 on which the upper punch 5 is fixed is attached to the upper ram plate 59 through cylinders 56, so the compressive-molding of the first powder shown in FIG. 6 is performed by the actuation of the cylinders 56. This compressive-molding is performed for the purpose of arranging the upper surface of the preparatory green compact, as described above, usually with a total pressure of 2 tons or less and a pressure per unit area of several tens–several hundreds of Kg. It is sufficient for the above-mentioned purpose to use a hydraulic or a pneumatic circuit employing a cylinder. Further, when the final compressive-molding is performed as shwon in FIG. 10, the cylinder pressure is released so that the upper ram plate 59 can directly act on the upper punch 5 through the upper punch plate 57 to thereby produce a high molding pressure.

Figure 14:
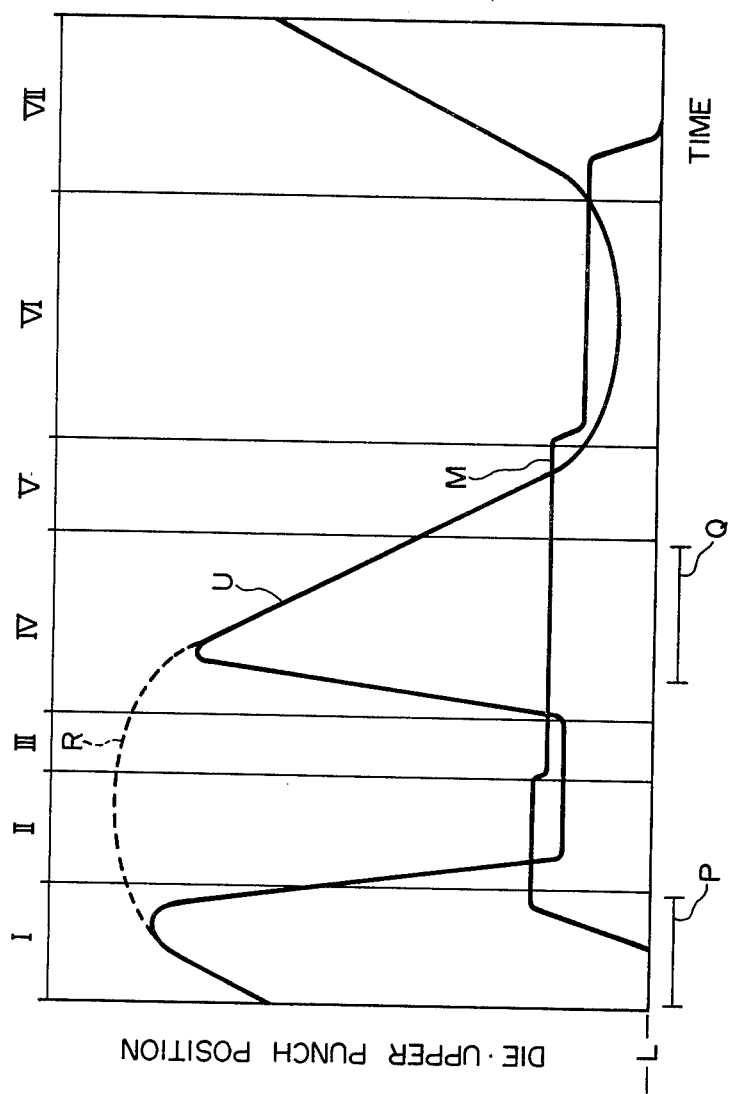
FIG. 14 is a graph illustrating the operations of the method according to the present invention.

FIG. 14 shows the valve seat producing steps of the embodiment employing a press-molding machine having the upper punch plate 57. In FIG. 14, the ordinate represents the position of the die or the upper punch with respect to the position L of the lower punch and the abscissa represents time. The symbols U, R, M, P and Q represent the position of the upper punch, the position of the upper ram, the position of upper surface of each of the die and the core rod, the duration of actuation of the first feed shoe, and the duration of actuation of the second feed shoe, respectively, and the symbols I, II, III, IV, V, VI and VII represent the states of FIGS. 5, 6, 7, 8, 9, 10 and 11, respectively. To control the position of the die in FIG. 14, a die-pressing rod 55 is provided on the upper punch plate 57 as shown in FIG. 13 so that the die is pushed down to the state of FIG. 7 from the state of FIG. 6 by the lowering of the upper punch plate 57 on one hand, and another die-pressing rod 54 is provided on the upper ram plate 59 as shown in FIG. 4 on the other hand so that the state is changed from that of FIG. 9 to that of FIG. 10. At this time, the cylinder 27 of the lower ram plate 28 shown in FIG. 4 is caused to be in its floating state so as not to prevent the actuation of the die-pressing rod of each of the upper punch plate and the upper ram plate.

According to the present invention, it is preferable to cause the second sintered alloy used at the valve seat surface side to have a finally finished width of 1–4 mm regardless of the dimensions of the valve seat, in view of wear-proofing as well as economy. To this end, the ratio between the first and second sintered alloys is selected to be substantially in the range of 2:1–7:1. In some cases at this time, it becomes necessary to cause the die to move upwardly in the states of FIGS. 6 and 7. This is achieved by pushing up the lower ram plate shown in FIG. 4.

Figure 11:
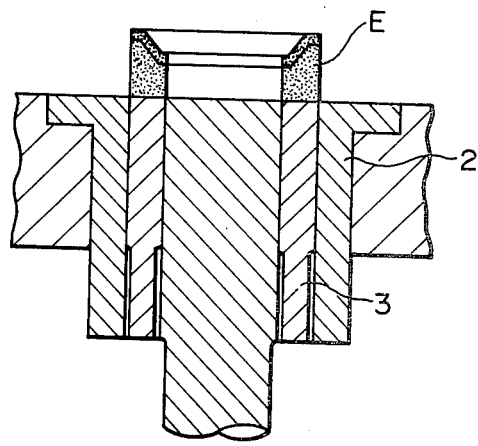

As described above, in the method of producing a compound valve seat, particularly a sintered compound valve seat, according to the present invention, the quantity of the second sintered alloy at the valve contact surface side can be accurately controlled and a stabilized boundary layer between the first and second sintered alloys can be obtained so that the relative quantity of the second sintered alloy can be reduced, and as apparent from FIG. 11, the shape of the green compact approximates the final shape of the valve seat and the second sintered alloy at the valve seat surface side has a uniform thickness, so that there is no risk that the second sintered alloy may be made to small in quantity due to the finished width in finishing the valve seat surface.

Further, in comparison with the conventional press-molding machine, in the method according to the present invention, the strength of the upper punch and the die is not reduced, the molding cycle is not prolonged and producibility is superior.

What is claimed is:

1. A method of producing a compound sintered article using a press-molding machine provided with a compression space defined by a die, a core rod, an upper punch and a lower punch, and including means for feeding different kinds of powder, in which at least two different powders are charged into the compression space, compressively molded, and then sintered, comprising;

moving said lower punch relatively downwardly to form a first space, and advancing first feeding means to charge a first powder into said first space;

moving said upper punch provided with a shaped protrusion at its inner circumference relatively downwardly to compress said first powder to form of preparatory green compact;

moving said upper punch upwardly, and at the same time causing said lower punch to move relatively to said die so as to dispose the upper surface of said preparatory green compact at a predetermined position, and advancing second feeding means to charge a second powder into a space formed above said preparatory green compact;

moving said upper punch downwardly to compressively integrally mold said second powder together with said preparatory green compact to form a final green compact;

removing said final green compact; and sintering said final green compact.

2. A method according to claim 1, in which, after said upper and lower punches have been moved at the same speed so as to dispose said preparatory green compact at said predetermined position within said die, said upper punch is moved upwardly and said second feeding means is advanced to charge in said second powder.

3. A method according to claim 1, in which said upper punch is provide with a sleeve fitted to the outside of said upper punch so as to surround the same, and in which in each of said compressing steps, said sleeve is made to be in contact with said die before said upper punch reaches the upper surface of the powder.

4. A method according to claim 1, wherein the first of said compressing steps, to form said preparatory green compact, is carried out at a pressure equal to one third or less the pressure employed in compressingly integrally molding said powders.

5. A method according to claim 1, said shaped protrusion comprising a conical member for defining a boundary plane between said two powders.

6. A method according to claim 1, said first and second feeding means comprising feeding shoes for charging respective powders during relative movement of said lower punch.

7. A method according to claim 1, wherein the density of said preparatory green compact is lower by at least 50% than that of said final green compact.

8. A method according to claim 1, wherein said preparatory green compact is supported by both said upper and lower punches during relative movement thereof to said predetermined position.

9. A method according to claim 1, wherein during compressively integrally molding said powders, said upper punch is first moved downwardly to mold the upper portion of the compact followed by a joint lowering of said upper punch and said die to additionally mold the lower portion thereof.

10. A method according to claim 1, wherein said removing step is performed by moving said upper punch upwardly while causing said lower punch to move relatively upwardly.

* * * * *